(12) United States Patent
Bolourchi

(10) Patent No.: US 6,625,530 B1
(45) Date of Patent: Sep. 23, 2003

(54) FEED FORWARD—FEED BACK CONTROL FOR STEER-BY-WIRE SYSTEM

(75) Inventor: Farhad Bolourchi, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/707,243

(22) Filed: Nov. 6, 2000

(51) Int. Cl.$^7$ ................................................ B62D 6/04
(52) U.S. Cl. ...................................... 701/42; 180/402
(58) Field of Search ............................ 701/42, 41, 65; 180/6.2, 6.24, 6.44, 6.5, 6.6

(56) References Cited

U.S. PATENT DOCUMENTS

| | | | | |
|---|---|---|---|---|
| 4,860,844 A | * | 8/1989 | O'Neil ........................ 180/402 |
| 4,869,335 A | * | 9/1989 | Takahashi ..................... 180/412 |
| 4,951,199 A | * | 8/1990 | Whitehead .................... 180/446 |
| 5,001,637 A | * | 3/1991 | Shiraishi et al. .............. 701/41 |
| 5,044,956 A | * | 9/1991 | Behensky et al. ............. 434/45 |
| 5,228,757 A | | 7/1993 | Ito et al. ....................... 303/100 |
| 5,251,135 A | | 10/1993 | Serizawa et al. ......... 364/424.05 |
| 5,307,892 A | * | 5/1994 | Phillips ........................ 180/422 |
| 5,338,250 A | * | 8/1994 | Swilley et al. ............... 452/127 |
| 5,347,458 A | | 9/1994 | Serizawa et al. ......... 364/424.05 |
| 5,374,877 A | | 12/1994 | Imaseki et al. ............... 318/34 |
| 5,429,548 A | * | 7/1995 | Long et al. .................. 452/127 |
| 5,449,199 A | * | 9/1995 | Heinrichs et al. ........... 280/775 |
| 5,513,720 A | * | 5/1996 | Yamamoto et al. .......... 180/421 |
| 5,576,957 A | | 11/1996 | Asanuma et al. ......... 364/424.05 |
| 5,653,304 A | | 8/1997 | Renfroe ....................... 180/402 |
| 5,668,722 A | * | 9/1997 | Kaufmann et al. .......... 180/446 |
| 5,704,446 A | * | 1/1998 | Chandy et al. .............. 180/446 |
| 5,717,590 A | * | 2/1998 | Mihalko ...................... 180/443 |
| 5,719,766 A | * | 2/1998 | Bolourchi et al. ............ 701/42 |
| 5,740,040 A | | 4/1998 | Kifuku et al. ............ 364/424.05 |
| 5,765,116 A | * | 6/1998 | Wilson-Jones et al. ...... 180/168 |
| 5,774,819 A | * | 6/1998 | Yamamoto et al. .......... 180/446 |
| 5,828,972 A | * | 10/1998 | Asanuma et al. ............ 180/446 |
| 5,829,547 A | | 11/1998 | Fujii et al. .................... 180/422 |
| 5,890,081 A | * | 3/1999 | Sasaki ........................ 280/5.515 |
| 5,913,375 A | * | 6/1999 | Nishikawa ................... 180/167 |
| 5,925,083 A | | 7/1999 | Ackermann ................... 701/41 |
| 6,018,691 A | | 1/2000 | Yamamoto et al. ........... 701/41 |
| 6,055,467 A | * | 4/2000 | Mehring et al. ............. 180/168 |
| 6,076,627 A | | 6/2000 | Bohner et al. ............... 180/422 |
| 6,079,513 A | * | 6/2000 | Nishizaki et al. ........... 180/402 |
| 6,097,286 A | * | 8/2000 | Discenzo .................... 180/415 |
| 6,098,296 A | * | 8/2000 | Perisho et al. ............... 33/203 |
| 6,102,151 A | | 8/2000 | Shimizu et al. ............. 180/446 |
| 6,152,254 A | | 11/2000 | Phillips ....................... 180/422 |
| 6,154,695 A | * | 11/2000 | Shimizu et al. ............. 180/204 |
| 6,176,341 B1 | * | 1/2001 | Ansari ......................... 180/402 |
| 6,179,394 B1 | | 1/2001 | Browalski et al. ........... 303/146 |
| 6,208,923 B1 | | 3/2001 | Hommel ....................... 701/42 |
| 6,209,677 B1 | | 4/2001 | Bohner et al. ............... 180/406 |
| 6,219,604 B1 | * | 4/2001 | Dilger et al. ................ 180/422 |
| 6,240,350 B1 | * | 5/2001 | Endo ........................... 180/204 |
| 6,279,674 B1 | * | 8/2001 | Lissel et al. ................. 180/402 |
| 6,279,675 B1 | | 8/2001 | Bohner et al. ............... 180/403 |
| 6,283,243 B1 | | 9/2001 | Bohner et al. ............... 180/406 |
| 6,285,936 B1 | | 9/2001 | Bohner et al. ................. 701/41 |

FOREIGN PATENT DOCUMENTS

| | | | | |
|---|---|---|---|---|
| EP | 0 278 366 B1 | 3/1991 | ........... B62D/6/00 |
| EP | 0 858 408 B1 | 10/1996 | ........... B62D/5/06 |
| EP | 0 985 591 A2 | 8/1999 | ........... B62D/5/06 |
| GB | 2 341 588 A | 3/2000 | ........... B62D/5/32 |
| JP | 60-259570 | 12/1985 | ........... B62D/7/14 |
| JP | 1-115778 | 10/1987 | ........... B62D/7/14 |
| JP | 8-34353 | 2/1996 | ........... B62D/1/12 |
| WO | WO 00/34106 | 6/2000 | ........... B62D/1/06 |

\* cited by examiner

*Primary Examiner*—William A. Cuchlinski, Jr.
*Assistant Examiner*—Olga Hernandez
(74) *Attorney, Agent, or Firm*—Michael D. Smith

(57) ABSTRACT

A steer-by-wire control system comprising a master control unit, a road wheel unit electrically connected to the master control unit and a steering wheel unit electrically connected to the master control unit. The steering wheel unit includes a feed forward control path and a feed back control path.

70 Claims, 1 Drawing Sheet

FEED FORWARD— FEED BACK CONTROL FOR STEER-BY-WIRE SYSTEM

FIELD OF THE INVENTION

This disclosure relates to steer-by-wire vehicle control systems.

BACKGROUND

Steering equipment for assisting a driver to steer an automobile is well known in the art. In conventional steering assemblies, the operator controls the direction of the vehicle with the aid of a steering wheel. This wheel is mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

Because the steering wheel is connected directly to the road wheels, the resulting mechanical assembly that provides the connection can be quite complicated and expensive to produce. One advantage of having a direct connection is that the operator receives tactile feedback through the steering wheel. For example, if the vehicle changes directions while it is moving, the operator will feel resistance in the steering wheel.

In contrast, in typical steer-by-wire control systems, the steering wheel does not have a direct mechanical connection to the road wheels. Rather, the steering wheel is used to produce control signals that are transmitted to electric drive motors and actuators that are used to turn the road wheels. Typically, the angular rotational displacement of a shaft connected to the steering wheel is detected by sensors, such as position and torque sensors, and converted into an electric signal or plurality of signals. This electronic signal is processed and applied to an electric motor that is connected to and controls the angular positioning of the road wheels of the vehicle with respect to the position of the vehicle body. The road wheels are then moved according to the signal received by the motor to effect the steering of the vehicle. Because steer-by-wire steering control systems do not have a direct mechanical connection to the steered wheels, the vehicle operator does not inherently receive the tactile feedback that is provided by conventional systems. Therefore, it is desirable to incorporate mechanisms into steer-by-wire steering control systems that are adapted to provide input to a vehicle operator that simulate some of the tactile feedback characteristics of a conventional steering system.

Steer-by-wire systems commonly employ a torque feedback system to provide the operator with the appropriate tactile feedback. Commonly, the road forces are measured, compensated as necessary, and applied as a reference command to a steering wheel control system. The steering wheel control system in turn, maintains the torque at the steering wheel. In steer-by-wire systems, two methods have been considered for converting the sensed road forces back to the driver. The first method is direct, and simply commands the sensed forces to the steering wheel actuator to provide the road resistance to the driver. The advantage of this method is that the driver (almost) instantaneously feels the road forces. Although some modifications to the road force sensor signal are done, like vehicle speed modulation, there is no effort tracking in this method. As such, the modulated signal is commanded in a direct (or open loop) fashion to the steering wheel actuator. With careful tuning, this method is adequate. But, due to lack of feedback, the resulting steering feel to the driver will be sensitive to changes in the system or component variations.

The second method once again utilizes the (modulated) road force sensor, but then compares it in a feedback loop with a torque sensor signal to generate an error signal. Following appropriate compensation, a final command is given to the steering wheel actuator. The advantage of this method is its insensitivity to variations (and or disturbances) in the steering wheel system. Unfortunately, to ensure adequate tactile feedback of road forces, the loop gain generally needs to be quite high, thereby making the system potentially prone to instability, noise susceptibility, and the like.

Therefore, it is considered advantageous to provide a steer-by-wire steering control system that provides desirable immediate tactile feedback to the operator and is less sensitive to induced disturbances, but avoids instability and noise susceptibility.

BRIEF SUMMARY OF THE INVENTION

A steer-by-wire control system comprising a master control unit, a road wheel unit electrically connected to the master control unit and a steering wheel unit electrically connected to the master control unit. The steering wheel unit includes a feed forward control path and a feed back control path.

A method of steering a vehicle comprising producing a tie rod force signal, a road wheel position signal, a steering wheel position signal, a steering wheel torque signal, and a vehicle speed signal. The method also includes generating a steering wheel torque command signal, a road wheel command signal and controlling a steering wheel unit with a feed forward control path and a feed back control path.

A storage medium encoded with a machine-readable program code for steering a vehicle, the storage medium including instructions for causing a computer to implement a method comprising producing a tie rod force signal, a road wheel position signal, a steering wheel position signal, a steering wheel torque signal, and a vehicle speed signal. The method also includes generating a steering wheel torque command signal, a road wheel command signal and controlling a steering wheel unit with a feed forward control path and a feed back control path.

A computer data signal for steering a vehicle, the computer data signal comprising code configured to cause a computer to implement a method comprising producing a tie rod force signal, a road wheel position signal, a steering wheel position signal, a steering wheel torque signal, and a vehicle speed signal. The method also includes generating a steering wheel torque command signal, a road wheel command signal and controlling a steering wheel unit with a feed forward control path and a feed back control path.

DETAILED DESCRIPTION OF THE INVENTION

Figure 1:
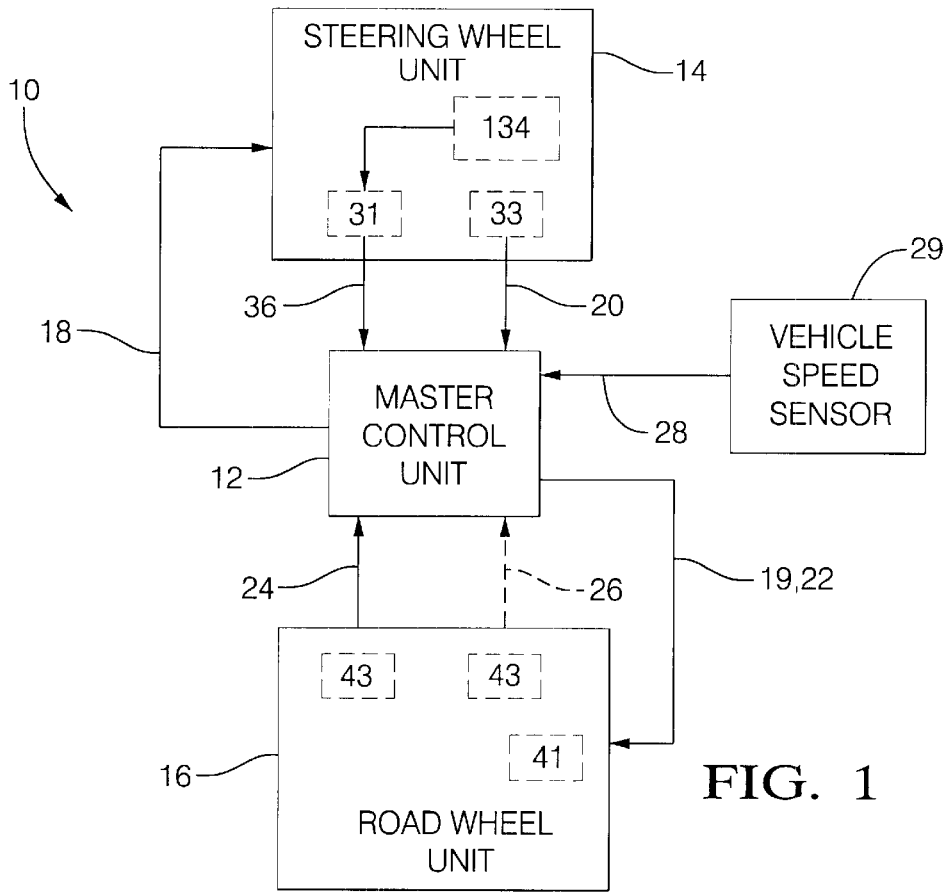
FIG. 1 is a block diagram illustrating the steer-by-wire control system.

Referring to FIG. 1, there is shown a steering control system for a vehicle, such as an automobile. The steering system 10 comprises several closed loop subsystems that work together to provide an operator with control over the direction of the vehicle.

The present invention may be utilized in various types of vehicles employing electronic steering or steer-by-wire systems. A preferred embodiment of the invention, by way of illustration is described herein as it may be applied to an automobile employing a steer-by-wire steering system. While a preferred embodiment is shown and described by illustration and reference to an automobile steering system, it will be appreciated by those skilled in the art that the invention is not limited to use in automobiles alone, but may be applied to all vehicles employing electronic steering systems or steer-by-wire systems steering systems.

A steering wheel unit 14 detects the position and movement of a steering wheel (not shown) with a steering wheel position sensor 33 and sends a steering wheel position signal 20 to the master control unit 12. In a preferred embodiment, steering wheel as used herein comprises automobile steering wheels of known configuration such as an inner hub and outer circular wheel attached to the hub. However, it will be appreciated by those skilled in the art that the present invention is not limited to the use of conventional steering wheel designs only, but would include any device of suitable shape and size adapted to provide a steering input to the steering wheel unit 14.

The steering wheel unit 14 is a closed loop control system that uses steering wheel torque signal 36 as the feedback to control a steering wheel actuator 134. The steering wheel torque command signal 18 is received from the master control unit 12. The steering wheel torque command signal 18 is compared to the internally generated feedback steering wheel torque signal 36 to yield a torque error signal as needed to comply with the steering wheel torque command signal 18 and maintain the stability of the steering wheel unit 14 control system. The steering wheel actuator 134 contains the necessary elements to provide a reaction torque to the operator as well as a torque sensor 31 to provide feedback, the steering wheel torque signal 36 to the steering wheel unit 14 and the master control unit 12. A steering wheel position sensor 33 is also included that produces a steering wheel position signal 20. Generally, reaction torque will be imparted to the operator by an electric motor coupled either to the steering column or the rack (not shown).

The master control unit 12 combines the information of the steering wheel position 20 with a speed signal 28 from the vehicle speed sensor 29 and the tie rod force signals 24, 26 (one each for a left and right wheel) from the road wheel unit 16. The master control unit 12 processes these signals to compensate for signal spectral content and produces a steering wheel torque command signal 18, which is sent to the steering wheel unit 14. In an embodiment, the master control unit 12 combines the tie rod force signals 24, 26 to generate a composite tie-rod force signal. Further, the master control unit 12 includes processing means to index the composite tie-rod force signals into a set of one or more torque look-up tables. Where more than one look-up table is used, the outputs are preferably blended based upon a ratio dependent upon the vehicle speed signal 28. For example, two lookup tables might be used, one for low speeds and one for highway speeds. As the vehicle speed signal increases, the table for highway speeds becomes increasingly dominant in the blend over the table for low speeds. Finally the indexed signal is applied to a frequency based compensator (not shown) to generate the steering wheel torque command signal 18.

Also in an embodiment, using the steering wheel position 20, with a speed signal 28 from the vehicle speed sensor 29, and the steering wheel torque signal 36, the master control unit 12 produces road wheel command signals 19, 22 (one each for a left and right wheel) that are sent to the road wheel unit 16. The road wheel command signals may include variable compensations dependent for example, upon vehicle speed signal 28, and steering wheel torque signal 36. It will be appreciated that the road wheel command could be dependent upon input from additional sensors and functions. In addition, there may also be a desire to command each road wheel unit 16 with a different command as required to obtain desired performance. For example, the commands may differ when cornering a vehicle to enhance individual road wheel tracking of the desired radius.

The road wheel unit 16, like the steering wheel unit 14, is also a closed loop control system that uses a road wheel position signal detected by a road wheel position sensor 41 as a feedback signal to control a road wheel actuator thereby, controlling the direction of the vehicle. There may typically be a road wheel unit 16 for each steerable wheel, though only one is shown in the FIG. 1. A tie rod sensor 43 is also located within road wheel unit 16. The tie rod sensor 43 detects and measures the forces on the tie rods and sends signals (24 for one wheel, 26 for the other) representative of the measured forces to the master control unit 12.

It will be appreciated, that the steering wheel unit 14, master control unit 12, and road wheel unit 16 are described for illustrative purposes. The processing performed throughout the system may be distributed in a variety of manners. For example, distributing the processing performed in the master control unit 12 among the other processes employed may eliminate the need for such a component or process as described. Further, each of the major systems may have additional functionality that will be described in more detail herein. As used herein, signal connections may physically take any form capable of transferring a signal, including electrical, optical, or radio, whether digital, modulated, or not.

The disclosed invention provides a system and method of converting the sensed road forces back to the driver thereby providing the appropriate tactile feedback and steering sensitivity. This is accomplished by combining the direct or feed forward method and the feed back method in such a manner that the resulting system enjoys the benefits of both methods yet avoids the potential shortcomings of the either. A preferred embodiment is based on the understanding of the spectral characteristics of the steering wheel torque command signal 18 as generated from the tie rod force signals 24, and 26. More specifically, that the spectral components of the steering wheel torque command signal 18 that need to be felt instantaneously by the driver to provide satisfactory tactile feel are high frequency in nature, and the components that need to be tracked to ensure appropriate level of driver effort are low frequency in nature. Therefore, the steering wheel torque command signal 18 may be split into two or more sets of spectral components. The high frequency components providing a direct or feed forward command injected directly to the actuator. The low frequency components are tracked with a torque sensor signal in a feedback fashion before being applied to the steering wheel actuator of the steering wheel unit 14. It will be appreciated that while an embodiment as disclosed is applied to the steering wheel torque command signal, the same methodology may be employed to the tie rod force signals 24, 26 separately as generated in the road wheel unit 16 prior to combination and compensation in the master control unit 12. For example, it may be desirable to apply the control methodology to the tie rod force signals 24, and 26 without combining them, thereby facilitating independent manipulation of the two signals, rather than utilizing their combination.

Figure 2:
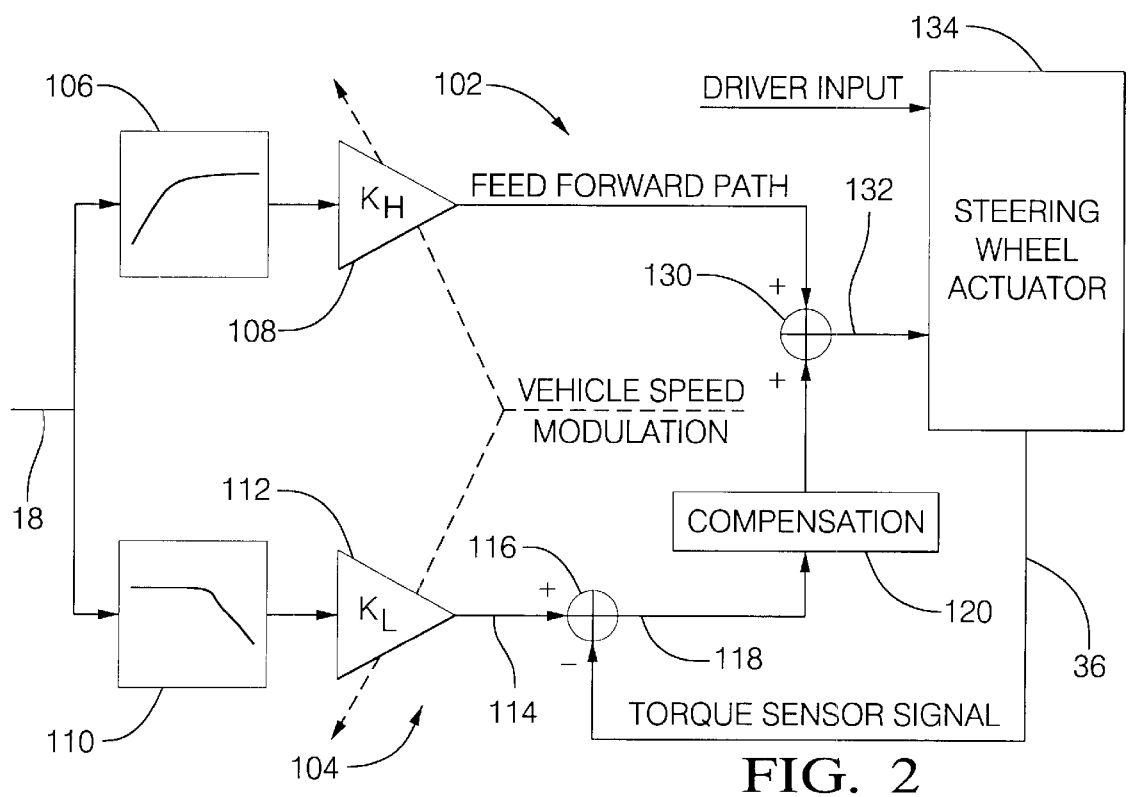
FIG. 2 is a block diagram of the processes employed to implement an embodiment of the invention.

Referring now to FIG. 2 for a more complete understanding of an embodiment. FIG. 2 depicts a block diagram of a process employed in the steering wheel unit 14 for the steering wheel torque command signal 18. The steering wheel torque command signal 18 is split into two paths 102 and 104. In the direct or feed forward path 102, the steering wheel torque command signal 18 is applied to a first frequency based filter e.g., high pass) 106. The first frequency based filter 106 is configured to allow only those parts of the steering wheel torque command signal 18 whose spectral content exceeds a predetermined first cutoff frequency to pass. The predetermined first cutoff frequency and the filter order are selected based upon providing adequate compensation so as to increase system bandwidth as well as providing adequate road feedback and steering feel characteristics to the operator. It is also noteworthy to recognize that the filter cutoff frequency and order may also be selected to compensate for the dynamic frequency based characteristics of the actuator of the steering wheel unit 14 to provide desirable tactile feel over the spectrum or bandwidth of operation. Finally, it will be appreciated that the selected cutoff frequency and order may be selected to enhance the disturbance rejection characteristics of steering wheel system. Thereby, enhancing operator feel and increasing the insensitivity of the system to undesirable disturbances such as actuator torque ripple or gear tooth cogging. Returning to FIG. 2, this high frequency resultant in the feed forward path 102 is then modulated or scaled as a function of vehicle speed at 108, before being passed to summer 130.

In the feedback path 104, the steering wheel torque command signal 18 is applied to a second frequency based filter (e.g., low pass) 110. The second frequency based filter 110 is configured to allow only those parts of the steering wheel torque command signal 18 whose spectral content is below a second predetermined cutoff frequency to pass. The predetermined second cutoff frequency and filter order are selected based upon providing adequate compensation so as to provide adequate road feedback and steering feel characteristics to the operator. Once again, the filter cutoff frequency and order may also be selected to compensate for the dynamic frequency based characteristics of the actuator of the steering wheel unit 14 to provide appropriate tactile feel over the spectrum or bandwidth of operation. Finally, it will be appreciated that the selected cutoff frequency and order may be selected to enhance the disturbance rejection characteristics of steering wheel unit 14 of steering system 10. Thereby, enhancing operator feel and increasing the insensitivity of the system to undesirable disturbances such as actuator torque ripple or gear tooth cogging. This low frequency resultant in the feed back path 104 is then modulated or scaled as a function of vehicle speed at 1 12, before being passed to error summer 116.

It is significant to note that the first cutoff frequency and order of the first frequency based filter 106 for the feed forward path 102 and the second frequency based filter 110 for the feedback path 104 may or may not be equivalent. Therefore, providing either overlap of the frequency content in the feed forward path 102 with the feed back path 104 or, on the other hand there could be a notch or gap in the frequency content provided to the combined paths. For example, if the cutoff frequency for the first frequency based filter 106 is set at a higher frequency than the cutoff frequency of the second frequency based filter 110, then the total frequency content provided to the steering wheel system would lack some of the frequency information between the two cutoff frequencies. In an embodiment, a single, one pole low pass filter is employed. The high frequency content is obtained by subtracting the low frequency resultant from the original signal. Therefore, a single cutoff frequency results. In an embodiment, the single cutoff frequency is set at one hertz.

Returning once again to FIG. 2, error summer 116 combines the scaled low frequency spectral resultant 114 with a reference, the steering wheel torque signal 36 thereby yielding a steering wheel torque error signal 118. The torque error signal 118 is passed through a frequency-based compensator 120 and then combined at summer 130 with the signal from the feed forward path 102. The summed signal is the composite steering wheel torque signal 132 transmitted to the steering wheel actuator 134 of the steering wheel unit 14. The frequency-based compensator is selected based upon providing adequate compensation so as to maintain stability of the inner torque feed back loop and to provide adequate road feedback and steering feel characteristics to the operator. Once again, the frequency-based compensator may also be selected to compensate for the dynamic frequency based characteristics of the actuator of the steering wheel unit 14 to provide desirable tactile feel over the spectrum or bandwidth of operation. Further, it will be appreciated that the selected cutoff frequency and order may be selected to maintain acceptable disturbance rejection characteristics of steering wheel unit 14 of the steering system 10.

It is noteworthy to appreciate that the composite steering wheel torque signal 132 transmitted to the steering wheel actuator 134 of the steering wheel unit 14 is formulated by the combination of the feed forward signal from the feed forward control path 102 and the feed back signal from said feed back control path 104. The feed forward signal and the feed back signal are configured in conjunction to maintain stability of said steer-by-wire system 10. For example, the selection of each of the elements of both the feed forward path 102 and the feedback path 104 are considered simultaneously to address maintaining the system stability.

It will also be appreciated that the gains or scaling may take the form of multipliers, schedulers or lookup tables and the like, which are configured to be dynamic and may also be the function of other parameters. For example, as depicted in FIG. 2, the gain may be variable and a function of vehicle speed. Alternatively, it should also be noted, that these kinds of modulations or scheduling may also be performed on the road sensor signal before being divided into the desired spectrums, depending on application.

It is important to note that all the examples provided herein relate to a vehicle having two steerable wheels. However, this type of system could be easily extended to a vehicle that requires all four wheels to be steered simultaneously by adding an additional road wheel unit or units 16.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steer-by-wire control system, comprising:
   a master control unit;
   a road wheel unit electrically connected to said master control unit;
   a steering wheel unit electrically connected to said master control unit; said steerng wheel unit includes a feed forward control path; and said steering wheel unit includes a feed back control path;
   a vehicle speed sensor for producing a vehicle speed signal, said vehicle speed sensor electrically connected to said master control unit and said steering wheel unit;
   wherein said road wheel unit includes a road wheel position sensor and a least one tie rod sensor to produce and transmit a tie rod force signal;
   wherein said steering wheel unit includes a steering wheel position sensor to produce and transmit a steering wheel position signal and a torque sensor to produce and transmit a steering wheel torque signal; and
   wherein said master control unit generates a steering wheel torque command signal in response to said tie-rod force signal and said vehicle speed signal.

2. The steer-by-wire control system of claim 1 wherein said at least one steering wheel unit includes a steering wheel actuator responsive to a steering wheel torque command signal.

3. The steer-by-wire control system of claim 1 wherein said steering wheel actuator is responsive to a composite steering wheel torque command signal.

4. The steer-by-wire control system of claim 1 wherein said composite steering wheel torque command signal is a result of a summation of a feed forward signal from said feed forward control path and a feed back signal from said feed back control path.

5. The steer-by-wire control system of claim 1, wherein a feed forward signal from said feed forward control path and a feed back signal from said feed back control path are configured in conjunction to maintain stability of said steer-by-wire system.

6. The steer-by-wire control system of claim 1, wherein said feed forward control path comprises:
   a first frequency based filter configured to pass only a first spectral content of said steering wheel torque command signal which is greater than a predetermined first cutoff frequency; and
   a first modulator responsive to said vehicle speed disposed to scale said first spectral content thereby generating said feed forward signal.

7. The steer-by-wire control system of claim 6, wherein said first cutoff frequency and said scale of said first modulator are selected to increase bandwidth of said steer-by-wire system.

8. The steer-by-wire control system of claim 7, wherein said first cutoff frequency and said scale of said first modulator are selected to provide road feedback and steering feel characteristics of said steer-by-wire system to an operator.

9. The steer-by-wire control system of claim 8, wherein said first cutoff frequency and said scale of said first modulator are selected to enhance disturbance rejection characteristics of said steering wheel unit of said steer-by-wire system.

10. The steer-by-wire control system of claim 6, wherein said first cutoff frequency and said scale of said first modulator are selected to provide road feedback and steering feel characteristics of said steer-by-wire system to an operator.

11. The steer-by-wire control system of claim 6, wherein said first cutoff frequency and said scale of said first modulator are selected to enhance disturbance rejection characteristics of said steering wheel unit of said steer-by-wire system.

12. The steer-by-wire control system of claim 1, wherein said feed back control path comprises:
   a second frequency based filter configured to pass only a second spectral content of said steering wheel torque command signal which is less than a predetermined second cutoff frequency;
   a second modulator responsive to said vehicle speed disposed to scale said second spectral content thereby generating a scaled low frequency resultant signal;
   a summer disposed to combine said scaled low frequency resultant signal and said steering wheel torque signal generating a steering wheel torque error signal; aid
   a frequency based compensator responsive to said steering wheel torque error signal, configured to generate said feed back signal.

13. The steer-by-wire control system of claim 12, wherein said second cutoff frequency and said scale of said second modulator are selected to provide road feedback feel characteristics of said steer-by-wire system to an operator.

14. The steer-by-wire control system of claim 13, wherein said second cutoff frequency and said scale of said second modulator are selected to enhance disturbance rejection characteristics of said steering wheel unit of said steer-by-wire system.

15. The steer-by-wire control system of claim 11, wherein said second cutoff frequency and said scale of said second modulator are selected to provide road feedback feel characteristics of said steer-by-wire system to an operator.

16. The steer-by-wire control system of claim 11, wherein said second cutoff frequency and said scale of said second modulator are selected to enhance disturbance rejection characteristics of said steering wheel unit of said steer-by-wire system.

17. The steer-by-wire control system of claim 11, wherein said frequency based compensator is selected to maintain stability of said steering wheel unit.

18. The steer-by-wire control system of claim 17, wherein said frequency based compensator is selected to maintain acceptable disturbance rejection characteristics of said steering wheel unit.

19. The steer-by-wire control system of claim 11, wherein said frequency based compensator is selected to maintain acceptable disturbance rejection characteristics of said steering wheel unit.

20. A method of steering a vehicle, the method comprising:
   receiving a tie rod force signal and a road wheel position signal;

receiving a steering wheel position signal and a steering wheel torque signal;
receiving a vehicle speed signal;
generating a steering wheel torque command signal;
generating a road wheel command signal;
controlling a steering wheel unit;
wherein said controlling includes a feed forward control path;
wherein said controlling includes a feed back control path;
wherein said tie rod force signal and a road wheel position signal and produced in road wheel unit electrically connected to a master control unit; and
wherein said steering wheel torque command signal is generated in response to said tie-rod force signal and said vehicle speed signal.

21. The method of claim 20 wherein said steering wheel position signal and a steering wheel torque signal are produced in a steering wheel unit electrically connected to said master control unit.

22. The method of claim 20 wherein said vehicle speed signal is produced with a vehicle speed sensor electrically connected to said master control unit and said steering wheel unit.

23. The method of claim 20 wherein said steering wheel unit includes a steering wheel actuator responsive to said steering wheel torque command signal.

24. The method of claim 23 wherein said steering wheel actuator is responsive to a composite steering wheel torque command signal.

25. The method of claim 24, wherein said composite steering wheel torque command signal is a result of a summation of a feed forward signal from said feed forward control path and a feed back signal from said feed back control path.

26. The method of claim 20, wherein a feed forward signal from said feed forward control path and a feed back signal from said feed back control path are configured in conjunction to maintain stability of said steer-by-wire system.

27. The method of claim 20, wherein said feed forward control path comprises:
passing a first spectral content of said steering wheel torque command signal which is greater than a predetermined first cutoff frequency of a first frequency based filter; and
scaling said first spectral content with a first modulator responsive to said vehicle speed, thereby generating said feed forward signal.

28. The method of claim 27, wherein said first cutoff frequency and said scaling are selected to increase bandwidth of said steer-by-wire system.

29. The method of claim 28, wherein said first cutoff frequency and said scaling are selected to provide road feedback and steering feel characteristics of said steer-by-wire system to an operator.

30. The method of claim 29, wherein said first cutoff frequency and said scaling are selected to enhance disturbance rejection characteristics of said steering wheel unit of said steer-by-wire system.

31. The method of claim 27, wherein said first cutoff frequency and said scaling are selected to provide road feedback and steering feel characteristics of said steer-by-wire system to an operator.

32. The method of claim 27, wherein said first cutoff frequency and said scaling are selected to enhance disturbance rejection characteristics of said steering wheel unit of said steer-by-wire system.

33. The method of claim 20, wherein said feed back control path comprises:
passing only a second spectral content of said steering wheel torque command signal which is less than a predetermined second cutoff frequency of a second frequency based filter;
scaling said second spectral content thereby generating a scaled low frequency resultant signal;
summing said scaled low frequency resultant signal and said steering wheel torque signal generating a steering wheel torque error signal; and
compensating said steering wheel torque error signal, to generate said feed back signal.

34. The method of claim 33, wherein said second cutoff frequency and said scaling are selected to provide road feedback feel characteristics of said steer-by-wire system to an operator.

35. The method of claim 34, wherein said second cutoff frequency and said scaling are selected to enhance disturbance rejection characteristics of said steering wheel unit of said steer-by-wire system.

36. The method of claim 33, wherein said second cutoff frequency and said scaling are selected to provide road feedback feel characteristics of said steer-by-wire system to an operator.

37. The method of claim 33, wherein said second cutoff frequency and said scaling are selected to enhance disturbance rejection characteristics of said steering wheel unit of said steer-by-wire system.

38. The method of claim 33, wherein said compensating is selected to maintain stability of said steering wheel unit.

39. The method of claim 38, wherein said compensating is selected to maintain acceptable disturbance rejection characteristics of said steering wheel unit.

40. The method of claim 33, wherein said compensating is selected to maintain acceptable disturbance rejection characteristics of said steering wheel unit.

41. The method of claim 20 wherein said steering wheel torque command signal is generated in response to said tie-rod force signal and said vehicle speed signal.

42. The method of claim 41 wherein said tie rod force signal and a road wheel position signal are produced in a road wheel unit electrically connected to said master control unit.

43. The method of claim 42 wherein said steering wheel position signal and a steering wheel torque signal are produced in a steering wheel unit electrically connected to said master control unit.

44. The method of claim 43 wherein said vehicle speed signal is produced with a vehicle speed sensor electrically connected to said master control unit and said steering wheel unit.

45. The method of claim 44 wherein said steering wheel unit includes a steering wheel actuator responsive to said steering wheel torque command signal.

46. The method of claim 45 wherein said steering wheel actuator is responsive to a composite steering wheel torque command signal.

47. The method of claim 46 wherein said composite steering wheel torque command signal is a result of a summation of a feed forward signal from said feed forward control path and a feed back signal from said feed back control path.

48. The method of claim 47, wherein said feed forward signal from said feed forward control path and a feed back signal from said feed back control path are configured in conjunction to maintain stability of said steer-by-wire system.

49. The method of claim 48, wherein said feed forward control path comprises:
    passing a first spectral content of said steering wheel torque command signal which is greater than a predetermined first cutoff frequency; and
    scale said first spectral content thereby generating said feed forward signal.

50. The method of claim 49, wherein said first cutoff frequency and said scaling are selected to increase bandwidth of said steer-by-wire system.

51. The method of claim 50, wherein said first cutoff frequency and said scaling are selected to provide road feedback and steering feel characteristics of said steer-by-wire system to an operator.

52. The method of claim 51, wherein said first cutoff frequency and said scaling are selected to provide road feedback and steering feel characteristics of said steer-by-wire system to an operator.

53. The method of claim 49, wherein said first cutoff frequency and said scaling are selected to enhance disturbance rejection characteristics of said steering wheel unit of said steer-by-wire system.

54. The method of claim 49, wherein said first cutoff frequency and said scaling are selected to enhance disturbance rejection characteristics of said steering wheel unit of said steer-by-wire system.

55. The method of claim 48, wherein said feedback control path comprises:
    passing only a second spectral content of said steering wheel torque command signal which is less than a predetermined second cutoff frequency;
    scaling said second spectral content thereby generating a scaled low frequency resultant signal;
    summing to combine said scaled low frequency resultant signal and said steering wheel torque signal generating a steering wheel torque error signal; and
    compensating said steering wheel torque error signal, configured to generate said feedback signal.

56. The method of claim 55, wherein said second cutoff frequency and said scaling are selected to provide road feedback and steering feel characteristics of said steer-by-wire system to an operator.

57. The method of claim 56, wherein said second cutoff frequency and said scaling are selected to enhance disturbance rejection characteristics of said steering wheel unit of said steer-by-wire system.

58. The method of claim 55, wherein said second cutoff frequency and said scaling are selected to provide road feedback and steering feel characteristics of said steer-by-wire system to an operator.

59. The method of claim 55, wherein said second cutoff frequency and said scaling are selected to enhance disturbance rejection characteristics of said steering wheel unit of said steer-by-wire system.

60. The method of claim 55, wherein said compensating is selected to maintain stability of said steering wheel unit.

61. The method of claim 60, wherein said compensating is selected to maintain acceptable disturbance rejection characteristics of said steering wheel unit.

62. The method of claim 55, wherein said compensating is selected to maintain acceptable disturbance rejection characteristics of said steering wheel unit.

63. A storage medium encoded with a machine-readable computer program code for steering a vehicle, said storage medium including instructions for causing a controller to implement a method comprising:
    receiving a tie rod force signal and a road wheel position signal;
    receiving and transmitting a steering wheel position signal and a steering wheel torque signal;
    receiving a vehicle speed signal;
    generating a steering wheel torque command signal;
    generating a road wheel command signal;
    controlling a steering wheel unit wherein said controlling includes a feed forward control path;
    wherein said controlling includes a feed back control path;
    wherein said steering wheel unit includes a steering wheel actuator responsive to said steering wheel torque command signal;
    wherein said steering wheel actuator is responsive to a composite steering wheel torque command signal; and
    wherein said composite steering wheel torque command signal is a result of a summation of a feed forward signal from said feed forward control path and a feed back signal from said feed back control path.

64. The storage medium of claim 63, wherein said feed forward signal from said feed forward control path and a feed back signal from said feed back control path are configured in conjunction to maintain stability of said steer-by-wire system.

65. The storage medium of claim 64, wherein said feed forward control path comprises:
    passing only a first spectral content of said steering wheel torque command signal which is greater than a predetermined first cutoff frequency; and
    scaling said first spectral content thereby generating said feed forward signal.

66. The storage medium of claim 64, wherein said feed back control path comprises:
    passing only a second spectral content of said steering wheel torque command signal which is less than a predetermined second cutoff frequency;
    scaling said second spectral content thereby generating a scaled low frequency resultant signal;
    summing said scaled low frequency resultant signal and said steering wheel torque signal generating a steering wheel torque error signal; and
    compensating said steering wheel torque error signal, configured to generate said feed back signal.

67. A computer data signal for steering a vehicle, said computer data signal comprising code configured to cause a processor to implement a method comprising:
    receiving a tie rod force signal and a road wheel position signal;
    receiving a steering wheel position signal and a steering wheel torque signal;
    receiving a vehicle speed signal;
    generating a steering wheel torque command signal;
    generating a road wheel command signal;
    controlling a steering wheel unit;
    wherein said controlling includes a feed forward control path;
    wherein said controlling includes a feed hack control path;
    wherein said steering wheel unit includes a steering wheel actuator responsive to said steering wheel torque command signal;

wherein said steering wheel actuator is responsive to a composite steering wheel torque command signal; and wherein said composite steering wheel torque command signal is a result of a summation of a feed forward signal from said feed forward control path and a feed back signal from said feed back control path.

68. The computer data signal of claim 67, wherein said feed forward signal from said feed forward control path and a feed back signal from said feed back control path are configured in conjunction to maintain stability of said steer-by-wire system.

69. The computer data signal of claim 68, wherein said feed forward control path comprises:

passing a first spectral content of said steering wheel torque command signal which is greater than a predetermined first cutoff frequency; and scaling said first spectral content thereby generating said feed forward signal.

70. The computer data signal of claim 69, wherein said feed back control path comprises:

passing a second spectral content of said steering wheel torque command signal which is less than a predetermined second cutoff frequency;

scaling said second spectral content thereby generating a scaled low frequency resultant signal;

summing to combine said scaled low frequency resultant signal and said steering wheel torque signal generating a steering wheel torque error signal; and compensating said steering wheel torque error signal, configured to generate said feed back signal.

* * * * *